US012800133B2

(12) United States Patent
Bruchschmidt et al.

(10) Patent No.: US 12,800,133 B2
(45) Date of Patent: Nov. 17, 2026

(54) OPTICAL COUPLING ELEMENT AND USER INTERACTION DEVICE

(71) Applicant: Eaton Intelligent Power Limited, Dublin (IE)

(72) Inventors: Frank Bruchschmidt, Dausenau (DE); Oliver Knoerrchen, Bonn (DE); Nico Clausnitzer, Geisig (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/369,259

(22) Filed: Oct. 26, 2025

(65) Prior Publication Data

US 2026/0153229 A1 Jun. 4, 2026

(30) Foreign Application Priority Data

Nov. 29, 2024 (DE) ......................... 102024135512.3

(51) Int. Cl.
*F21V 21/088* (2006.01)

(52) U.S. Cl.
CPC .................................. *F21V 21/088* (2013.01)

(58) Field of Classification Search
CPC ..... F21V 21/088; F21V 23/04; H01H 13/023; G02B 6/0096
USPC ...... 362/23.01, 0.03, 0.05, 0.09, 1, 16, 0.17; 200/310–317
See application file for complete search history.

(56) References Cited

U.S. PATENT DOCUMENTS

| | | | | |
|---|---|---|---|---|
| 6,019,478 | A | 2/2000 | Pizzo | |
| 7,884,297 | B2 * | 2/2011 | Okuzumi ............ | H01H 23/143 200/315 |
| 9,607,789 | B1 | 3/2017 | Hodea | |
| 2004/0136176 | A1 | 7/2004 | Umezawa | |
| 2011/0036693 | A1 * | 2/2011 | Lin ..................... | H01H 13/023 200/341 |
| 2016/0314915 | A1 * | 10/2016 | Chen ...................... | H01H 9/041 |

FOREIGN PATENT DOCUMENTS

| | | | |
|---|---|---|---|
| CN | 111095459 | * | 5/2020 |
| CN | 115274336 | A | 11/2022 |
| EP | 1261978 | B1 | 1/2008 |
| WO | WO 2025098708 | A1 | 5/2025 |

* cited by examiner

*Primary Examiner* — Thomas M Sember
(74) *Attorney, Agent, or Firm* — LEYDIG, VOIT & MAYER, LTD.

(57) ABSTRACT

Some embodiments are directed toward an optical coupling element including a housing and a light guidance element configured to guide light from a light-emitting element to a user interaction element. The light-emitting element is arranged on a carrier element. The user interaction element is fixedly connected to a mounting adapter via a first clip connection and the carrier element is fixedly connected to the mounting adapter via at least two fastening elements. The housing is fixedly connected to the mounting adapter via a second clip connection. The light guidance element is directly subordinated to the light-emitting element in a main emission direction. The optical coupling element is provided without mechanical fixation to the carrier element.

14 Claims, 3 Drawing Sheets

OPTICAL COUPLING ELEMENT AND USER INTERACTION DEVICE

CROSS REFERENCE TO RELATED APPLICATIONS

The present disclosure claims benefit from German Patent Application No. 102024135512.3 filed on Nov. 29, 2024, the contents of which are incorporated herein by reference in its entirety.

TECHNICAL FIELD

The present disclosure relates to an optical coupling element. The present disclosure further relates to a user interaction device, in particular including such an optical coupling element.

SUMMARY

Embodiments provide an improved optical coupling element which is particularly easy and flexible to assemble. Further embodiments provide an improved user interaction device which in particular comprises such an optical coupling element.

According to at least one embodiment, the optical coupling element comprises a housing and a light guidance element, in particular arranged in the housing. The optical coupling element is configured to guide light from a light-emitting element to a user interaction element. In particular, the light-emitting element is arranged on a carrier element.

For example, the light guidance element comprises a material transparent for the light emitted by the light-emitting element. Light emitted from the light-emitting element is guided via the light guidance element. The housing can be opaque for the light emitted by the light-emitting element. The housing can in particular be configured to mechanically support the light guidance element and to position the light guidance element with respect to the light-emitting element.

A mounting adapter is arranged between the carrier element and the user interaction element. The user interaction element is fixedly connected to the mounting adapter via a first clip connection and the carrier element is fixedly connected to the mounting element via at least two fastening elements. For example, the user interaction element penetrates an opening in a mounting plate of the mounting adapter. The first clip connection is arranged in the opening. That is in particular, the user interaction element comprises a first clipping structure and the mounting plate comprises a corresponding second clipping structure formed in the opening. The first and second clipping structure in particular form the first clip connection.

The fastening elements of the mounting adapter can extend, starting from the mounting plate, in a direction towards the carrier element. A defined distance between the mounting plate and the carrier element can be achieved with the fastening elements. The distance is, for example, 10 mm.

The housing of the optical coupling element can be fixedly connected to the mounting adapter via a second clip connection. In particular, the second clip connection can be arranged on a side of the mounting plate facing the carrier element. For example, the optical coupling element can be arranged between the mounting plate and the carrier element.

Further, the light guidance element is directly subordinated to the light-emitting element in a main emission direction. That is in particular, the light guidance element is arranged directly downstream the light-emitting element in the main emission direction. The light-emitting element may comprise at least one light-emitting diode or at least one laser diode. "Directly subordinated" in particular means here and in the following that no optical element that may influence light emitted by the light-emitting element is arranged between the light-emitting element and the light guidance structure. For example, the light emitted by the light-emitting element is not focused, diffracted, absorbed, reflected or scattered in an intermediate space between the light-emitting element and the light guidance element or the optical coupling element. For example, the intermediate space is filled with air. It is also possible that the optical coupling element or the light guidance structure touch an emission surface of the light-emitting element.

The main emission direction is in particular a direction in which a radiation characteristic of the light-emitting element comprises a global or local maximum. That is in particular, a majority of the light emitted by the light-emitting element during operation is emitted in the main emission direction.

The emission surface of the light-emitting element is formed by, for example, at least one outer surface of light-emitting element via which a majority of light leaves the light-emitting element during operation. For example, at least 80% or at least 90% or at least 95% of the light is emitted via the emission surface. For example, the emission surface is a surface of the light-emitting element facing away from the carrier element.

The optical coupling element can be provided without mechanical fixation to the carrier element. In particular, the optical coupling element is not fastened to the carrier element by a fastening means like a screw, a bolt, a clip or the like. The optical coupling element may touch the carrier element. For example, the optical coupling element may be kept in position by the second clip structure with respect to the light-emitting element. The optical coupling element may comprise a height, measured in a direction perpendicular to the carrier element, that is essentially the same as the distance between the mounting plate of the mounting adapter and the carrier element.

In at least one embodiment, the optical coupling element comprises a housing and a light guidance element configured to guide light from a light-emitting element to a user interaction element. The light-emitting element is arranged on a carrier element. The user interaction element is fixedly connected to a mounting adapter via a first clip connection and the carrier element is fixedly connected to the mounting adapter via at least two fastening elements. The housing is fixedly connected to the mounting adapter via a second clip connection. The light guidance element is directly subordinated to the light-emitting element in a main emission direction. The optical coupling element is provided without mechanical fixation to the carrier element.

The optical coupling element described herein is based, inter alia, on the following technical considerations. Common light fibers that are used to illuminate a user interference elements, which are, for example, pushbuttons or selector switches, comprise a base and a light guide. The base or socket typically has to be pressed or fastened to a carrier element, such as a printed circuit board (PCB), via mounting holes for installation. This may require precisely arranged mounting holes as well as precise alignment of the socket with respect to the mounting holes. Furthermore, common light fibers are typically not adapted for application in a relatively compact device, where the distance between the mounting adapter and the carrier element is comparably small. Thus, common light fibers must be expensively adapted, for example by cutting.

The optical coupling element described herein makes use of the idea to mechanically fasten the optical coupling element to the mounting adapter, while at the same time no fixation is present between the optical coupling element and the carrier element. Thus, no mounting holes may be required and the installation of the optical coupling element is facilitated. In particular, the optical coupling element can be adapted to the distance of the carrier element to the mounting plate, which eliminates the need for costly adaptations. Furthermore, the optical coupling element can be used with a variety of light-emitting elements and can easily be adapted to different applications, thus increasing flexibility in an application.

According to at least one embodiment of the optical coupling element, the housing of the optical coupling element is configured to completely laterally surround at least emission surfaces of the light-emitting element. The housing can be opaque for light emitted by the light-emitting element. For example, the housing comprises a recess, in which the light-emitting is at least partially located. The recess may laterally surround the emission surface of the light-emitting element. Here and in the following "laterally" means in particular "in a lateral direction", wherein a "lateral direction" is a direction parallel to a main extension plane of the carrier element.

Advantageously, stray light can be reduced by laterally surrounding the emission surfaces of the light-emitting element by the preferably opaque housing. Thus, light transmission by the optical coupling element can be improved, in particular compared to common light fibers that typically have a base with an open design, which means stray light that is laterally emitted is lost.

Furthermore, forming the housing with a recess for the light-emitting element advantageously allows the use of the optical coupling element for a variety of light-emitting elements, thus increasing variability in application.

According to at least one embodiment, the housing comprises a first fixation structure and a second fixation structure, each being configured to connect to the mounting adapter, wherein the first and second fixation structures comprise different geometric shapes. In particular, the mounting adapter comprises a first receiving structure corresponding to the first fixation structure and a second receiving structure corresponding to the second fixation structure. For example, the first and second receiving structures are arranged at a side of the mounting plate facing the carrier element. The first and second fixation structures can have different geometric shapes. In particular, the first fixation structure together with the first receiving structure and the second fixation structure together with the second receiving structure form the second clip connection.

Advantageously, using first and second fixation/receiving structures with different geometrical shapes facilitates installation of the optical coupling element, since the risk of faulty installation is significantly reduced. For example, the first/second fixation structure only complies with the first/second receiving structure and does not comply with the second/first receiving structure. Thus, only one way of installing the optical coupling element is possible during intended use.

According to at least one embodiment, the housing of the optical coupling element comprises a through-hole penetrating the housing from a light entrance face remote to the light entrance face. The light guidance element can be arranged in the through-hole. In particular, the main extension direction of the through-hole is parallel to the main emission direction of the light-emitting element.

For example, the light guidance element fills the through-hole true to form. This means in particular that the through-hole is completely filled with the light guidance element. For example, no air or other structural element is arranged between the light guidance element and the housing in the through-hole.

Alternatively, one or more additional elements may be arranged between the housing and the light guidance element, for example an adhesive element such as a glue. The light guidance element may be fixedly arranged in the through-hole by the adhesive element. In this case, the adhesive element can be only arranged on inner walls of the through-hole, while the light entrance face and light exit face are free of the adhesive element or any other structural element.

It is possible that the light guidance element is integrated with the housing. In particular, the housing and the light guidance element can only be separated by destroying the optical coupling element in this case. For example, the housing and the light guidance element are formed in a common process step.

It is additionally or alternatively possible that each of the housing and the light guidance element are formed in one piece. For example, the light guidance element is arranged in the though-hole in this case and is optionally fastened in the through-hole, for example by an adhesive element.

The housing and the light guidance element comprise different materials. In particular, the light guidance element comprises a material transparent for the light emitted by the light-emitting element and the housing can be opaque for the light emitted by the light-emitting element. For example, the light guidance element comprises or consists of polycarbonate and the housing comprises or consists of polyamide. Advantageously, the material of the light guidance element and the housing can be adapted to the specific function of the light guidance element and the housing. For example, polycarbonate may be refractory, making it unsuitable for the housing comprising the first and second fixation structure.

According to at least one embodiment, the light guidance element comprises a material at least partially transparent for the light emitted by the light-emitting element. For example, the light guidance element comprises polyamide or consists of polyamide. Additionally or alternatively, the light guidance element comprises Poly(methyl methacrylate), PMMA, and/or glass and/or glass fibers.

Additionally or alternatively, the light guidance element may comprise an admixture material. By the admixture material, optical properties of the light guidance element may be adapted. For example, a red chromophore or dye may be added to a material of the light guidance element. Red light or red light portions of the light emitted by the light-emitting element may be enhanced by adding a red chromophore to the light guidance element. For example, between 1% and 5% of a material of the light guidance element may be formed with the admixture material such as a chromophore.

Furthermore, a user interaction device is specified. The user interaction device may comprise the optical coupling element described herein in accordance with one or more embodiments during operation. This means that all features disclosed for the optical coupling element are also disclosed for the user interaction device and vice versa.

In at least one embodiment, the user interaction device comprises an optical coupling element described herein according to one or more of the embodiments described above. Furthermore, the user interaction device comprises a user interface element, a mounting adapter, and a carrier element.

The mounting adapter is fastened to the user interface element via a first clip connection. The carrier element is fastened to the carrier element via at least two fastening elements of the mounting adapter by means of mechanical connection elements. A housing of the optical coupling element is fixedly connected to the mounting adapter via a second clip connection. A light guidance element of the optical coupling element is directly subordinated to a light emitting element arranged on the carrier element in a main emission direction of the light-emitting element. The optical coupling element is provided to the carrier element without mechanical fixation.

The user interaction element is in particular a functional element that is configured to be operated by a user, also denoted as an operator here and in the following, and to provide optical information to an operator, for instance by light emission. In particular, light emitted by the user interaction element is provided by the light-emitting element via the optical coupling element.

For example, the user interaction element can function as or comprise a user-operable mechanical actuator and/or an optical indicator. The user-operable mechanical actuator can comprise or be, for example, a pushbutton, like a safety button, or a selector switch. The optical indicator can comprise a light-transmitting element that can be illuminated from a backside, for example via the light-emitting element and the optical coupling element. When, for example, the optical indicator is illuminated, light is transmitted through the optical indicator and can be perceived by the operator.

The user interaction element can also be a complex functional element such as an illuminated single pushbutton or an illuminated double actuator pushbutton. In case the user interaction element inter alia functions as or comprises a user-operable mechanical actuator, the user interaction element can comprise at least one actuating element like a plunger or the like that is moved due to interaction of the user with the user interaction element.

The user interaction element can comprise a user interaction part that is intended and configured for providing information to the operator and optionally additionally for being operated by an operator. In the case of a user-operable mechanical actuator, an operator can operate the user interaction part in order to move the actuating element. For example, the user interaction part can, for instance, comprise or be a light-transmitting window.

The mounting adapter can be intended and configured for mounting the carrier element with the light-emitting element to the user interaction element. In particular, the mounting adapter is intended and configured for mounting and fastening the carrier element to the connector part of the user interaction element. Furthermore, the mounting adapter is intended and configured for mounting the optical coupling element.

In particular, the mounting adapter comprises at least two fastening elements to which the carrier element is fastened. In particular, the carrier element can be fastened to each of the fastening elements by a mechanical connection element. The mechanical connection elements can be screws or locking bolts that can be inserted into holes of the fastening element. Such holes can be prefabricated, at least partly, or can be formed by the mechanical connection elements. The mechanical connection elements can be self-cutting screws. Each of the mechanical connection elements can reach through a hole in the carrier element into one of the fastening elements of the mounting adapter.

The at least two fastening elements extend and protrude from a side of the mounting plate of the mounting adapter in a direction towards the carrier element. For instance, each of the fastening elements can have a columnar or frustoconical basic shape and can be formed as a cylindrical or conical pin.

The at least two fastening elements and the mounting plate can form an integral component. In other words, the mounting adapter comprising the mounting plate and the at least two fastening elements can be formed as a single piece, and can be made from a plastic material such as polyamide 6.6. The mounting adapter can be manufactured by means of a molding process.

The at least two fastening elements can have a predetermined length so that the carrier element and thus the light-emitting element and optionally further electrical components arranged on the carrier are at a predefined position with respect to the user interaction element. Thus, the distance and relative position of the light-emitting element and optional further electrical components with respect to the user interaction element can be very precisely predetermined by the length of the at least two fastening elements independently of other geometrical factors like, for example, the thickness of the carrier element.

According to at least one embodiment, the light-emitting element provides an optical signal indicative of a state of the user interaction device, wherein the optical signal is guided to the user interaction part of the user interaction element by the optical coupling element and is perceivable at the user interaction part. For example, the optical signal is guided and perceivable at the light-transmitting window.

For example, the user interaction part can be partially illuminated if the user interaction device is in a first state. In another example, the user interaction device can be illuminated in different colors, depending on the state of the user interaction device.

Alternatively or additionally, the optical signal can provide information with respect to the user interaction device, for example regarding a usage of the user interaction device during operation. In particular, information provided by the optical signal is not specifically limited. It is possible that any suitable kind of information can be provided by the optical signal, which is perceivable at the user interaction part.

According to at least one embodiment, the light exit face of the optical coupling element is laterally surrounded by the user interaction element. Advantageously, lateral light loss can be reduced if the user interaction element surrounds the light exit face of the optical coupling element.

According to at least one embodiment, at least one electro-mechanical contact element is arranged on the carrier element. The at least one electro-mechanical contact element is operable by the user interaction element. For example, the at least one electro-mechanical contact element is one of the optional further electrical components arranged on the carrier element in addition to the light-emitting element.

For instance, in the case that the user interaction element is a user-operable mechanical actuator, the user interaction element can mechanically interact with the electro-mechanical contact element. The electro-mechanical contact element is, for example, a switch element that can provide an electrical signal indicative of a mechanical state of the user interaction element. The electrical signal can be, for instance, an electrical resistance, an electrical current and/or an electrical voltage. The mechanical state of the user interaction element can be, for instance, a position of an actuator element like a plunger. In other words, when an operator operates the user interaction element, for instance by pushing or turning the user interaction part, the electro-mechanical contact element can be switched from one state into another state by the actuator element of the user interaction element.

According to at least one embodiment, the interaction element reaches through an opening in a cap element. The user interaction element is fastened to the cap element by means of a threaded ring screwed on the connector part. The connector part is further fastened to the mounting adapter by means of the first clip connection. The connector part of the user interaction element is arranged on a side of the cap element facing the mounting adapter and, in particular, the user interaction part of the user interaction element is arranged on a side of the cap element facing away from the mounting adapter, and thus the carrier element.

In particular, the user interaction element can be fastened in the opening of the cap element. The threaded ring can be situated on a side of the cap element facing the carrier element. Consequently, the connector part can have a thread onto which the mounting ring is screwed. Particularly, the user interaction element can be the only part of the user interaction device that is directly fastened to the cap element, for instance by the mounting ring. All further components of the user interaction device described in the following can be held in place, directly or indirectly, by the user interaction element rather than by any part of the cap element.

The cap element can be part of a housing for the user interaction device. For example, the cap element is a front plate of the housing or is part of the front plate.

According to a further embodiment, the carrier element comprises or is a printed-circuit board (PCB). The light-emitting element and optionally the at least one electrical component can be mounted, i.e., mechanically and electrically connected, to the carrier element. The carrier element can comprise further electrical or electronic components for operating the at least one electrical component and for electrically connecting the user interaction device to other devices.

Further advantages and advantageous embodiments and further developments of the optical coupling element and the user interaction device described herein will become apparent from the following exemplary embodiments shown in connection with schematic drawings. Identical elements, elements of the same kind or elements having the same effect are provided with the same reference signs in the figures. The figures and the proportions of the elements shown in the figures are not to be regarded as true to scale. Rather, individual elements may be shown exaggeratedly large for better representability and/or for better comprehensibility.

DETAILED DESCRIPTION

Figure 1:
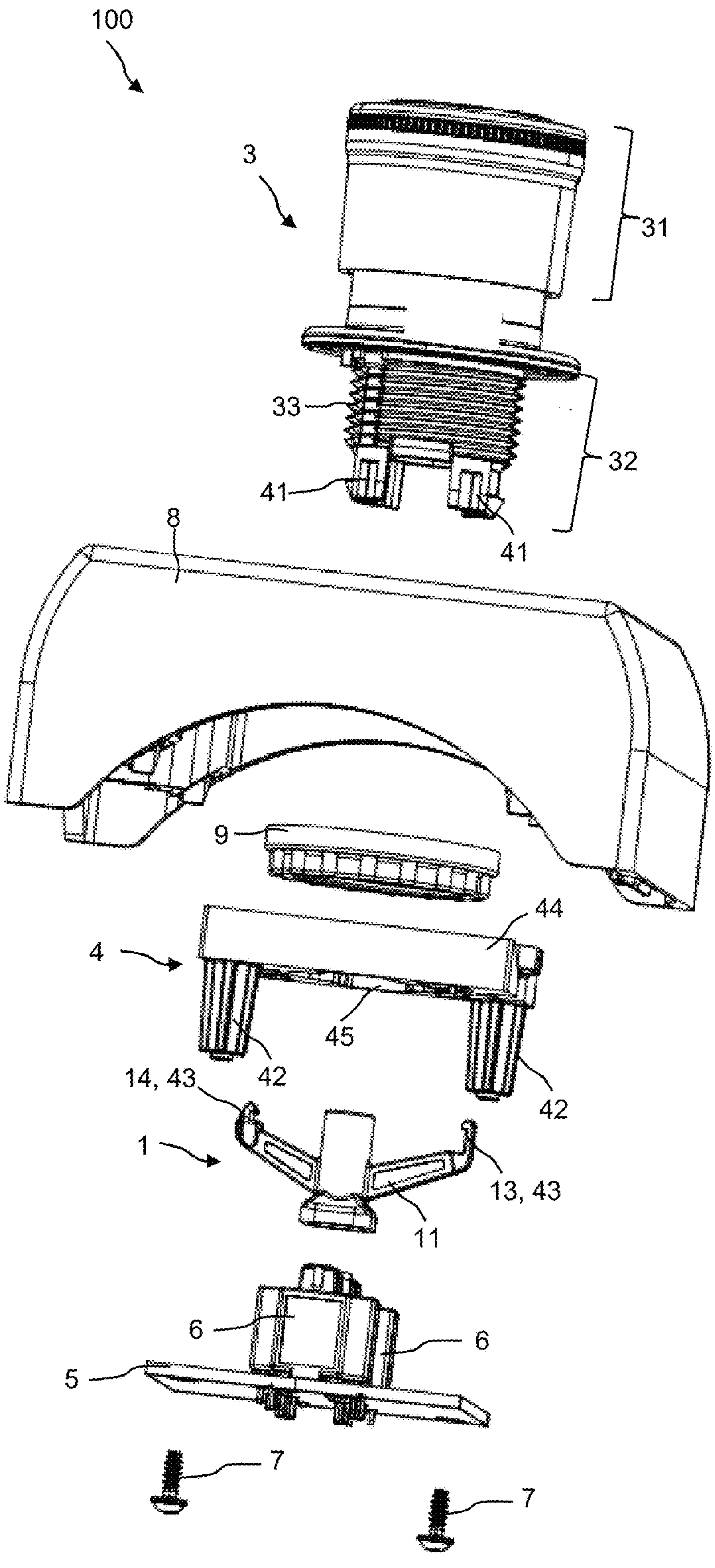
FIG. 1 shows a schematic exploded view of a user interaction device described herein according to an exemplary embodiment.

The user interaction device 100 described herein according to a first exemplary embodiment comprises a user interaction element 3, a cap element 8, a threaded ring 9, a mounting plate 4, an optical coupling element 1 and a carrier element 5, as illustrated in the exploded representation of FIG. 1.

The user interaction element comprises a user interaction part 31 and a connector part 32. As shown in the detailed representation of FIG. 2, the user interaction element 3 as arranged reaches through an opening 80 of the cap element 8. Thereby, the connector part 32 is arranged on a side of the cap element 8 facing the carrier element 5 and the user interaction part 31 is arranged on a side of the cap element 8 facing away from the carrier element 5. The connector part 32 comprises a thread 34 on which the threaded ring 9 is screwed to fasten the user interaction element 3 to the cap element 8. The cap element 8 can be part of a housing for the user interaction device 100.

The connector part 32 is further connected to the mounting adapter 4 via a first clip connection 41. The connector part 41 engages an opening 45 of a mounting plate 4 of the mounting adapter 4. The first flip connection 41 is arranged in the opening 45.

The mounting adapter 4 further comprises fastening elements 42 for fastening the carrier element 5 to the mounting adapter 4. The fastening elements 42 extend towards the carrier element 5 from a side of the mounting plate 44 facing the carrier element 5. The fastening elements 42 are configured to receive mechanical connection elements 7, such as screws or bolts, via which the carrier element 5 can be fastened to the mounting adapter 4.

The mounting adapter 4 can be formed as one piece such that the mounting plate 41 and the fastening elements 42 comprise the same material and are formed in a common process, for example a molding process. The mounting adapter 4 comprises a polymer such as polyamide.

Figure 2:
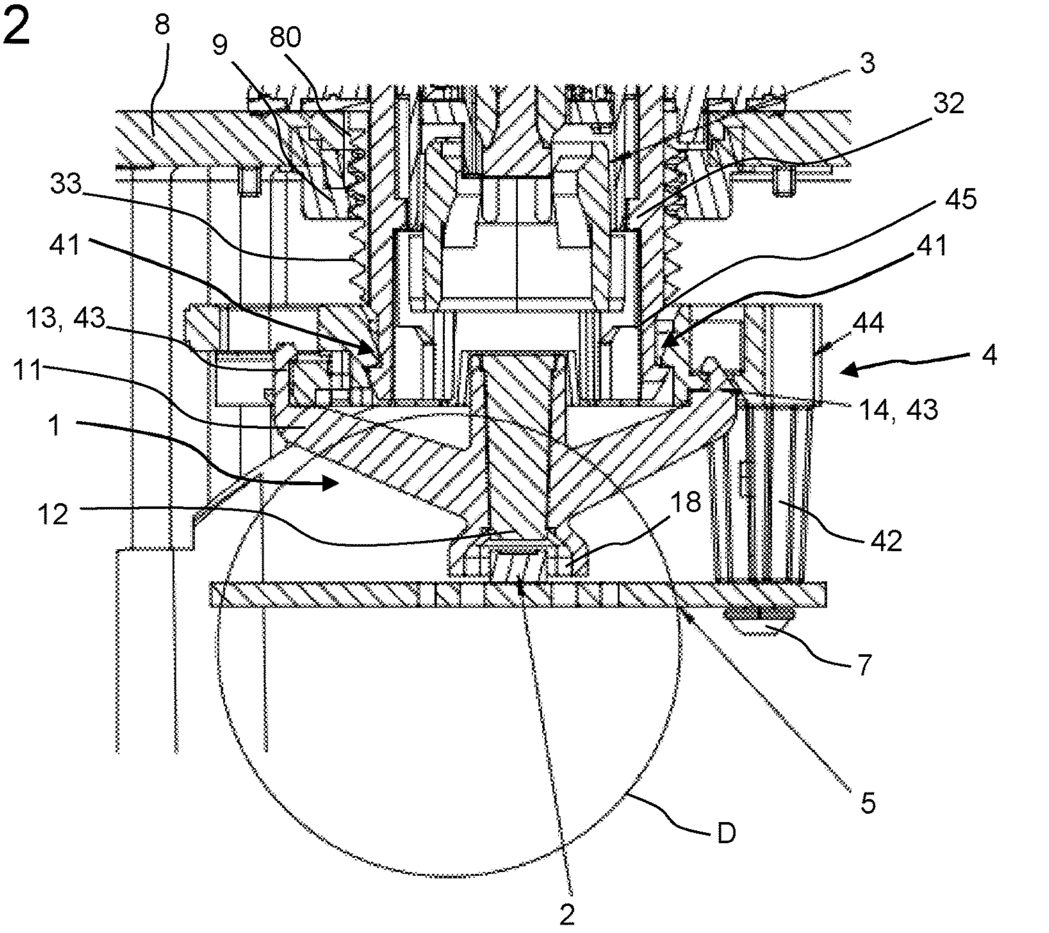
FIG. 2 shows a detailed view of the user interaction device of FIG. 1 in a schematic sectional view, illustrating an optical coupling element according to an exemplary embodiment used in the user interaction device.
Figure 3:
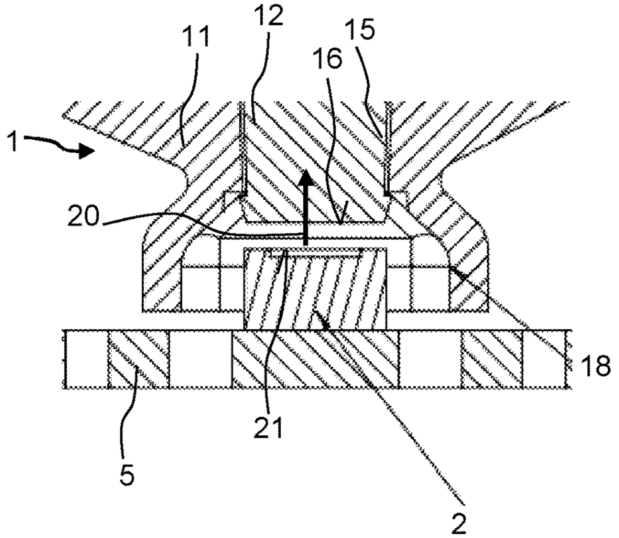
FIG. 3 shows a detailed view of the user interaction device of FIG. 2, illustrating an arrangement of the optical coupling element on a carrier element.

Two electro-mechanical contact elements 6 are arranged on the carrier element 5. The user interaction element 3 can mechanically interact with the electro-mechanical contact elements 6. The electro-mechanical contact elements 6 are, for example, switch elements. Furthermore, a light-emitting element 2 is arranged on the carrier element 5 on a side facing the mounting adapter 4 (FIGS. 2, 3).

The carrier element 5 is a printed-circuit board (PCB). The light-emitting element 2 and the electro-mechanical contact elements 6 are mechanically and electrically connected to the carrier element 5.

The optical coupling element 1 is arranged between the carrier element 5 and the mounting adapter 3. The optical coupling element 1 is configured to guide light from the light-emitting element 2 to the user interaction element 3. That is, the optical coupling element 1 optically couples the light-emitting element 2 to the user interaction element 3.

Figure 4:
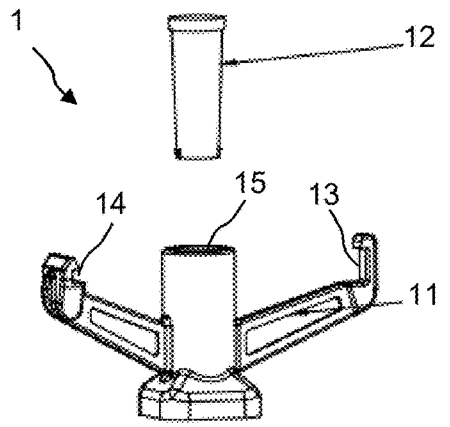
FIGS. 4 to 7 show the optical coupling element according to the exemplary embodiment in different views.
Figure 5:
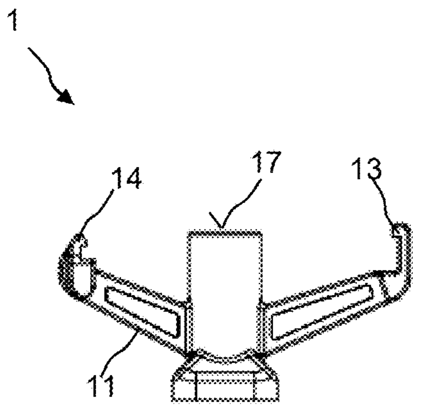
Figure 6:
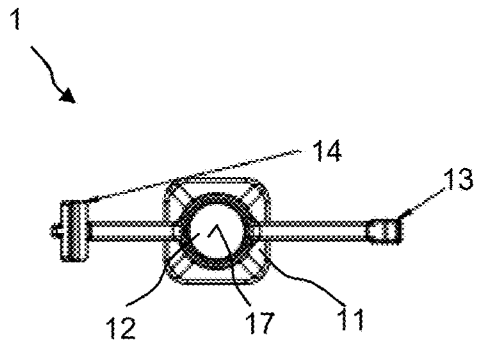
Figure 7:
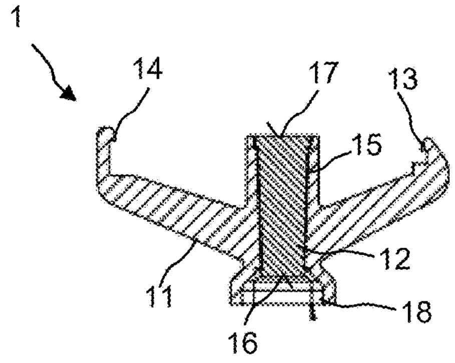

FIGS. 4 to 7 show different views of the optical coupling element. FIG. 4 shows an exploded view, FIG. 5 shows a side view, FIG. 6 shows a top view and FIG. 7 shows a sectional view of the optical coupling element 1.

The optical coupling element 1 comprises a housing 11 and a light guidance element 12. The light guidance element

12 is arranged in a through-hole 15 of the housing 11 (FIGS. 4, 7). The through-hole 15 penetrates the housing 11 from a light entrance face 16 to a light exit face 17. The light guidance element 12 comprises polycarbonate, PMMA, and/or glass and is transparent for light emitted by the light-emitting diode 2. Additionally or alternatively, the light guidance element 12 may comprise an admixture material. By the admixture material, optical properties of the light guidance element 12 may be adapted. For example, a red chromophore or dye may be added to a material of the light guidance element. Red light or red light portions of the light emitted by the light-emitting element may be enhanced by adding a red chromophore to the light guidance element 12. For example, between 1% and 5% of a material of the light guidance element 12 may be formed with the admixture material such as a chromophore.

The light guidance element 12 is configured to guide light from the light entrance face 16 to the light exit face 17. The housing 11 is opaque for the light-emitting element 2. The housing 11 comprises polyamide.

The optical coupling element 1 is fixedly connected to the mounting adapter 4 by a second clip connection 43. The second clip connection 43 is arranged on a side of the mounting plate 44 facing the carrier element 5. The optical coupling element 43 comprises a first fixation structure 13 and a second fixation structure 14. Geometric shapes of the first and second fixation structures 13, 14 are different from each other so that only one way for fastening the optical coupling element 1 to the mounting adapter 4 is possible during intended installation.

As shown in FIG. 3, which illustrates a detail D of FIG. 2, there is no mechanical fixation between the optical coupling element 1 and the carrier element 5. The optical coupling element 11 is arranged above the light-emitting element 2 and kept in position only by means of the mounting adapter 4. Thus, precise mounting holes in the carrier can be omitted and positioning the optical coupling element 1 is facilitated.

The housing 11 comprises a recess 18 in which the light entrance face 16 is accessible (FIG. 3). The recess 18 is formed such that the housing 11 laterally surrounds an emission surface 21 of the light-emitting element 2. The light-emitting element 2 is a light-emitting diode with an emission surface 21 on a side facing away from the carrier element 5. By the recess 18, stray light can be reduced.

The light guidance element 12 is arranged downstream of the light-emitting element 2 in a main emission direction 20. That is, light emitted by light-emitting element 2 can be coupled in the light guidance element 12 via the light entrance face 16. This light is guided to the light exit face 17 by the light guidance element 12. The light is further coupled out at the light exit face 16. The light exit face 16 is laterally surrounded by the user interaction element 3, as illustrated in FIG. 2. Thus, the user interaction element 3 can be illuminated by the light-emitting element 2 via the optical coupling element 1.

During operation of the user interaction device 100, the user interaction part 31 of the user interaction element 3 is illuminated by the light-emitting element 2 via the optical coupling element 1. For example, an optical signal is provided by the light-emitting element 2 via the optical coupling element 1 illustrating the state of the user interaction device 100. The user interaction part 31 comprises an optical indicator such as an illumination window, at which the optical signal can be perceived.

For example, the user interface element 3 is a pushbutton via which the user or operator can activate the electro-mechanical contact element 6 to switch a switch. The optical signal for example provides information about the state of the switch. For example, in a first state the user interaction part 31 is illuminated, or illuminated in a first color, and in a second state of the switch the user interaction part 31 is not illuminated, or illuminated in a second color different from the first color, respectively.

The presently disclosed subject matter is not restricted by the description on the basis of the exemplary embodiments. Rather, the presently disclosed subject matter encompasses any new feature, and also any combination of features, which in particular comprises any combination of features in the patent claims, even if this feature or this combination itself is not explicitly specified in the patent claims or exemplary embodiments.

REFERENCE NUMERALS

- 1 optical coupling element
- 2 light-emitting element
- 3 user interaction element
- 4 mounting adapter
- 5 carrier element
- 6 electro-mechanical contact element
- 7 mechanical connection element
- 8 cap element
- 9 threaded ring
- 11 housing
- 12 light guidance element
- 13 first fixation structure
- 14 second fixation structure
- 15 through-hole
- 16 light entrance face
- 17 light exit face
- 18 recess
- 20 main emission direction
- 21 emission surface
- 31 user interaction part
- 32 connector part
- 33 thread
- 41 first clip connection
- 42 fastening elements
- 43 second clip connection
- 44 mounting plate
- 45 mounting plate opening
- 80 opening of cap element
- 100 user interaction device

The invention claimed is:

1. An optical coupling element comprising:
   a housing and
   a light guidance element configured to guide light from a light-emitting element to a user interaction element, wherein
   light-emitting element is arranged on a carrier element,
   the user interaction element is fixedly connected to a mounting adapter via a first clip connection,
   the carrier element is fixedly connected to the mounting adapter via at least two fastening elements,
   the housing is fixedly connected to the mounting adapter via a second clip connection,
   the light guidance element is directly subordinated to the light-emitting element in a main emission direction,
   the optical coupling element is provided without mechanical fixation to the carrier element.

2. The optical coupling element according to claim 1, wherein the housing of the optical coupling element is configured to completely laterally surround at least emission surfaces of the light-emitting element, and the housing is opaque for light emitted by the light-emitting element.

3. The optical coupling element according to claim 1, wherein the housing includes a first fixation structure and a second fixation structure, each being configured to connect to the mounting adapter, and the first fixation structure and the second fixation structure comprise different geometric shapes.

4. The optical coupling element according to claim 1, wherein the housing includes a through-hole penetrating the housing from a light entrance face to a light exit face remote to the light entrance face, and the light guidance element is arranged in the through-hole.

5. The optical coupling element according to claim 1, wherein the light guidance element is integrated with the housing.

6. The optical coupling element according to claim 1, wherein the housing and the light guidance element are each formed in one piece, and the housing and the light guidance element include different materials.

7. A user interaction device comprising an optical coupling element comprising a user interface element;

a mounting adapter; and a carrier element, wherein the mounting adapter is fastened to the user interface element via a first clip connection, the carrier element is fastened to the mounting adapter via at least two fastening elements of the mounting adapter by means of mechanical connection elements, a housing of the optical coupling element is fixedly connected to the mounting adapter via a second clip connection, a light guidance element of the optical coupling element is directly subordinated to a light-emitting element arranged on the carrier element in a main emission direction of the light-emitting element, and the optical coupling element is provided without mechanical fixation to the carrier element.

8. The user interaction device according to claim 7, wherein the light-emitting element provides an optical signal indicative of a state of the user interaction device, wherein the optical signal is guided to a user interaction part of the user interaction element by the optical coupling element and is perceivable at the user interaction part.

9. The user interaction device according to claim 7, wherein a light exit face of the optical coupling element is laterally surrounded by the user interaction element.

10. The user interaction device according to claim 7, wherein at least one electro-mechanical contact element is arranged on the carrier element, the electro-mechanical contact element being operable by the user interaction element.

11. The user interaction device according to claim 7, wherein the user interaction element reaches through an opening in a cap element, the user interaction element comprises a connector part located on a side of the cap element facing the mounting adapter, the user interaction element is fastened to the cap element by means of a threaded ring screwed on the connector part, and the connector part is fastened to the mounting adapter by means of the first clip connection.

12. The user interaction device according to claim 7, wherein the user interaction element includes a user-operable mechanical actuator.

13. The user interaction device according to claim 7, wherein the user interaction element is a pushbutton or a selector switch.

14. The user interaction device according to claim 7, wherein the carrier element includes a printed-circuit board.

* * * * *